US012212082B2

(12) United States Patent
Niroo Jazi et al.

(10) Patent No.: US 12,212,082 B2
(45) Date of Patent: Jan. 28, 2025

(54) ANTENNA SYSTEM WITH FLOATING CONDUCTOR

(71) Applicant: QUALCOMM Incorporated, San Diego, CA (US)

(72) Inventors: Mahmoud Niroo Jazi, San Diego, CA (US); Mohammad Ali Tassoudji, San Diego, CA (US); Taesik Yang, San Diego, CA (US); Jeongil Jay Kim, San Diego, CA (US); Darryl Sheldon Jessie, San Diego, CA (US); Kevin Hsi-Huai Wang, San Diego, CA (US); Jorge Fabrega Sanchez, San Diego, CA (US); Hong-Ming Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 17/951,924

(22) Filed: Sep. 23, 2022

(65) Prior Publication Data

US 2024/0106124 A1 Mar. 28, 2024

(51) Int. Cl.
*H01Q 9/04* (2006.01)
*H01Q 9/16* (2006.01)
*H01Q 1/24* (2006.01)

(52) U.S. Cl.
CPC ............. *H01Q 9/0407* (2013.01); *H01Q 9/16* (2013.01); *H01Q 1/243* (2013.01)

(58) Field of Classification Search
CPC ......... H01Q 9/0407; H01Q 9/16; H01Q 1/243
See application file for complete search history.

(56) References Cited

U.S. PATENT DOCUMENTS

| | | | | |
|---|---|---|---|---|
| 11,133,596 | B2 | 9/2021 | Ou et al. | |
| 2008/0088510 | A1 | 4/2008 | Murata et al. | |
| 2015/0070228 | A1 * | 3/2015 | Gu | H01Q 25/00 343/727 |
| 2019/0348748 | A1 * | 11/2019 | Liu | H01L 23/3135 |
| 2020/0076055 | A1 * | 3/2020 | Jeon | H01Q 21/06 |
| 2020/0176864 | A1 | 6/2020 | Baek et al. | |
| 2021/0367358 | A1 | 11/2021 | He et al. | |

OTHER PUBLICATIONS

International Search Report and Written Opinion—PCT/US2023/074149—ISA/EPO—Dec. 14, 2023.

* cited by examiner

*Primary Examiner* — Seung H Lee
(74) *Attorney, Agent, or Firm* — SUNSTEIN LLP/Qualcomm Incorporated

(57) ABSTRACT

An antenna system includes: a patch antenna element disposed at a first level of the antenna system; an energy coupler configured and coupled to the patch antenna element to transfer energy between the patch antenna element and a front-end circuit; a ground conductor disposed at a second level of the antenna system, the patch antenna element and the ground conductor being disposed a separation distance away from each other and bounding respective sides of a volume defined by a projection, normal to a surface of the patch antenna element, of the patch antenna element to the ground conductor; and a floating conductor that is displaced from the ground conductor and the patch antenna element, the floating conductor comprising a body extending over a portion of the separation distance outside of, and in close proximity to, the volume.

21 Claims, 9 Drawing Sheets

ANTENNA SYSTEM WITH FLOATING CONDUCTOR

BACKGROUND

Wireless communication devices are increasingly popular and increasingly complex. For example, mobile telecommunication devices have progressed from simple phones, to smart phones with multiple communication capabilities (e.g., multiple cellular communication protocols, Wi-Fi, BLUETOOTH® and other short-range communication protocols), supercomputing processors, cameras, etc. Wireless communication devices have antennas to support various functionality such as communication over a range of frequencies, reception of Global Navigation Satellite System (GNSS) signals, also called Satellite Positioning Signals (SPS signals), etc.

With several antennas disposed in a single wireless communication device, available volume for antennas is at a premium. For example, smartphones may have numerous antennas (e.g., eight antennas, 10 antennas, or more) with very limited volume due to the size of devices that consumers desire. Consequently, antenna assemblies (e.g., modules) may be limited to very small volumes, e.g., with widths of 4 mm or less.

Despite the volume restrictions for antennas, desired functionality of the antennas continues to increase. With the advent of $5^{th}$ generation (5G) of wireless communication technology, mmW phased array antennas have received extensive attention to address the propagation loss and aperture blockage hurdles by introducing higher antenna gain and beamforming features. Multiple-input-multiple-output (MIMO) systems is one of the key enablers of 5G technology to increase the spectral efficiency and system capacity by effectively streaming the transmit/receive data with two orthogonally polarized signals (cross-polarized signals) in desired directions. The trend in consumer electronics is to develop RF assemblies (radio frequency assemblies) with small form factors which can be easily accommodated within the limited space of the emerging smart devices including cell phones and tablets. The physical requirements of antennas make maintaining or improving performance (e.g., in terms of coverage, latency, and quality of service over desired coverage area) difficult. In addition, forthcoming smart devices will be equipped with 5G technology and operate over five bands including, n258, n261, n257, n260, and n259. These require a sophisticated RF assembly with a price attractive to the market for high volume production. Dual-polarized microstrip phased array antennas with antenna-in-package (AIP) or system-in-package (SIP) developed with organic materials and PCB (Printed Circuit Board) fabrication technologies or ceramic materials with LTCC (Low Temperature Cofired Ceramic) fabrication technologies are possible architectures for addressing RF-assembly requirements for the next generation of consumer electronic devices.

It is difficult to design a compact and thin 5G phased array antenna system for operation over all five frequency bands that meets desired performance (e.g., in terms of efficiency, polarization isolation, cross polarization level, polarization orthogonality, scan angle, pattern shape, etc.). Microstrip antennas are an option for antenna design, and may be made compact by using high relative permittivity materials and/or by selective antenna element topology. Some techniques (e.g., slotted patches, reactive impedance surfaces (RISes), etc.) for improving cross-polarization performance of microstrip antennas may not operate well over all five frequency bands.

SUMMARY

An example antenna system includes: a patch antenna element disposed at a first level of the antenna system; an energy coupler configured and coupled to the patch antenna element to transfer energy between the patch antenna element and a front-end circuit; a ground conductor disposed at a second level of the antenna system, the patch antenna element and the ground conductor being disposed a separation distance away from each other and bounding respective sides of a volume defined by a projection, normal to a surface of the patch antenna element, of the patch antenna element to the ground conductor; and a floating conductor that is displaced from the ground conductor and the patch antenna element, the floating conductor comprising a body extending over a portion of the separation distance outside of, and in close proximity to, the volume.

Another example antenna system includes: a patch antenna element; a ground conductor; a dielectric material disposed between the patch antenna element and the ground conductor; and means for localizing fringing fields corresponding to the patch antenna element and the ground conductor closer to the patch antenna element.

DETAILED DESCRIPTION

Techniques are discussed herein for reducing patch antenna element size and/or reducing cross-polarization of dual-polarized patch antenna elements. For example, one or more floating conductors that are not electrically connected to either a patch antenna element or a ground conductor for the patch antenna element are disposed in close proximity to one or more radiating edges (edges capable of emitting and/or receiving wireless signals). The floating conductor(s) may localize fringing fields of the patch antenna element, intersecting the fringing fields. Other configurations, however, may be used.

Items and/or techniques described herein may provide one or more of the following capabilities, as well as other capabilities not mentioned. Size of a patch antenna element and an assembly containing a patch antenna element may be reduced, e.g., without using a relative permittivity material. Antenna efficiency may be increased, e.g., by reducing extraneous antenna pattern gain toward sides of patch antenna elements (e.g., reducing sideways radiation from a patch antenna element). Antenna performance (e.g., polarization performance (e.g., cross-polarization, polarization orthogonality, and/or polarization isolation), antenna pattern shape and/or efficiency) may be improved for a patch antenna element or an array of patch antenna elements, and may be improved without significant, if any, reduction in antenna bandwidth and/or efficiency compared to an antenna not using a float conductor as discussed herein. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
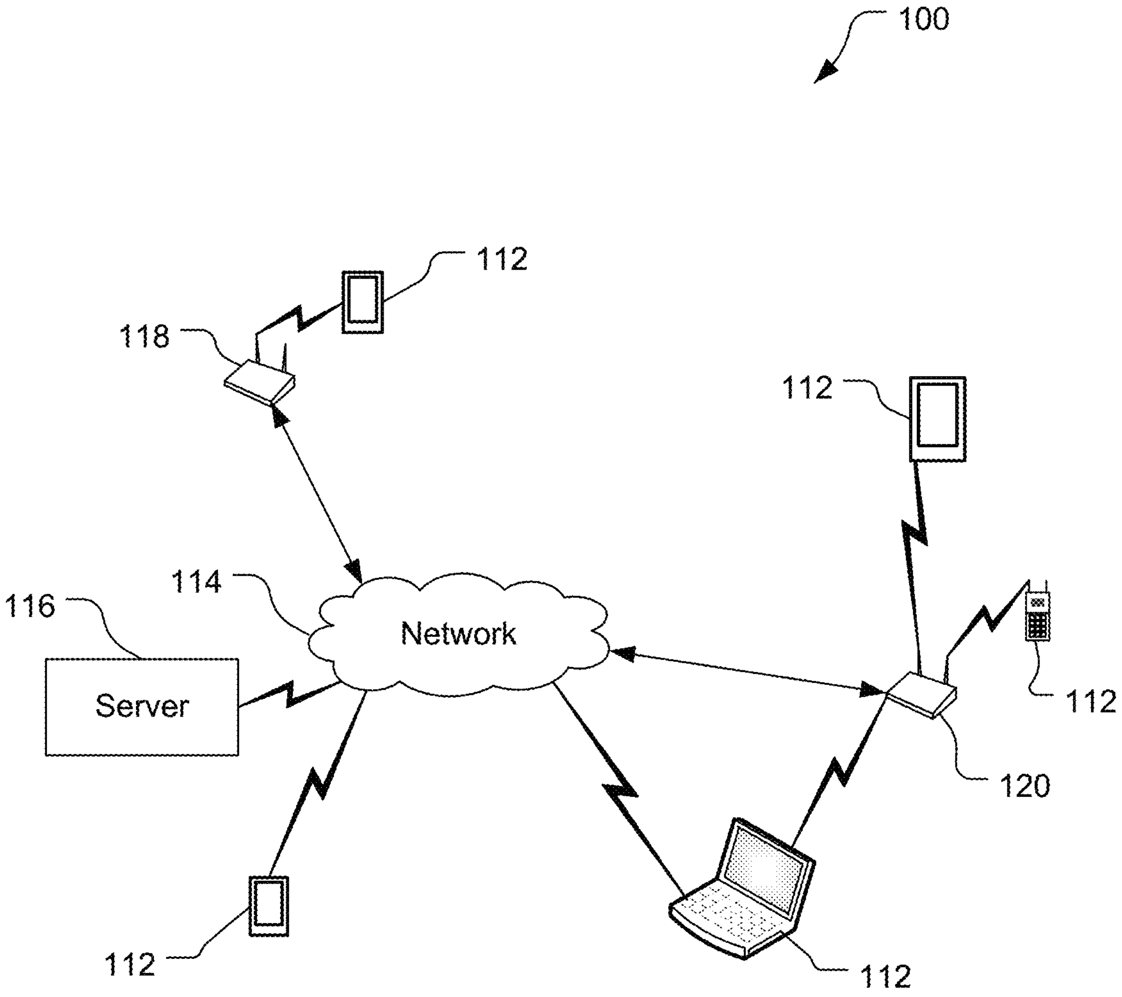
FIG. 1 is a schematic diagram of a communication system.

Referring to FIG. 1, a communication system 100 includes mobile devices 112, a network 114, a server 116, and access points (APs) 118, 120. The communication system 100 is a wireless communication system in that components of the communication system 100 can communicate with one another (at least sometimes) using wireless connections directly or indirectly, e.g., via the network 114 and/or one or more of the access points 118, 120 (and/or one or more other devices not shown, such as one or more base transceiver stations). For indirect communications, the communications may be altered during transmission from one entity to another, e.g., to alter header information of data packets, to change format, etc. The mobile devices 112 shown are mobile wireless communication devices (although they may communicate wirelessly and via wired connections) including mobile phones (including smartphones), a laptop computer, and a tablet computer. Still other mobile devices may be used, whether currently existing or developed in the future. Further, other wireless devices (whether mobile or not) may be implemented within the communication system 100 and may communicate with each other and/or with the mobile devices 112, network 114, server 116, and/or APs 118, 120. For example, such other devices may include internet of thing (IoT) devices, medical devices, home entertainment and/or automation devices, automotive devices, etc. The mobile devices 112 or other devices may be configured to communicate in different networks and/or for different purposes (e.g., 5G, Wi-Fi communication, multiple frequencies of Wi-Fi communication, satellite communication and/or positioning, one or more types of cellular communications (e.g., GSM (Global System for Mobiles), CDMA (Code Division Multiple Access), LTE (Long-Term Evolution), etc.), Bluetooth® communication, etc.).

Figure 2:
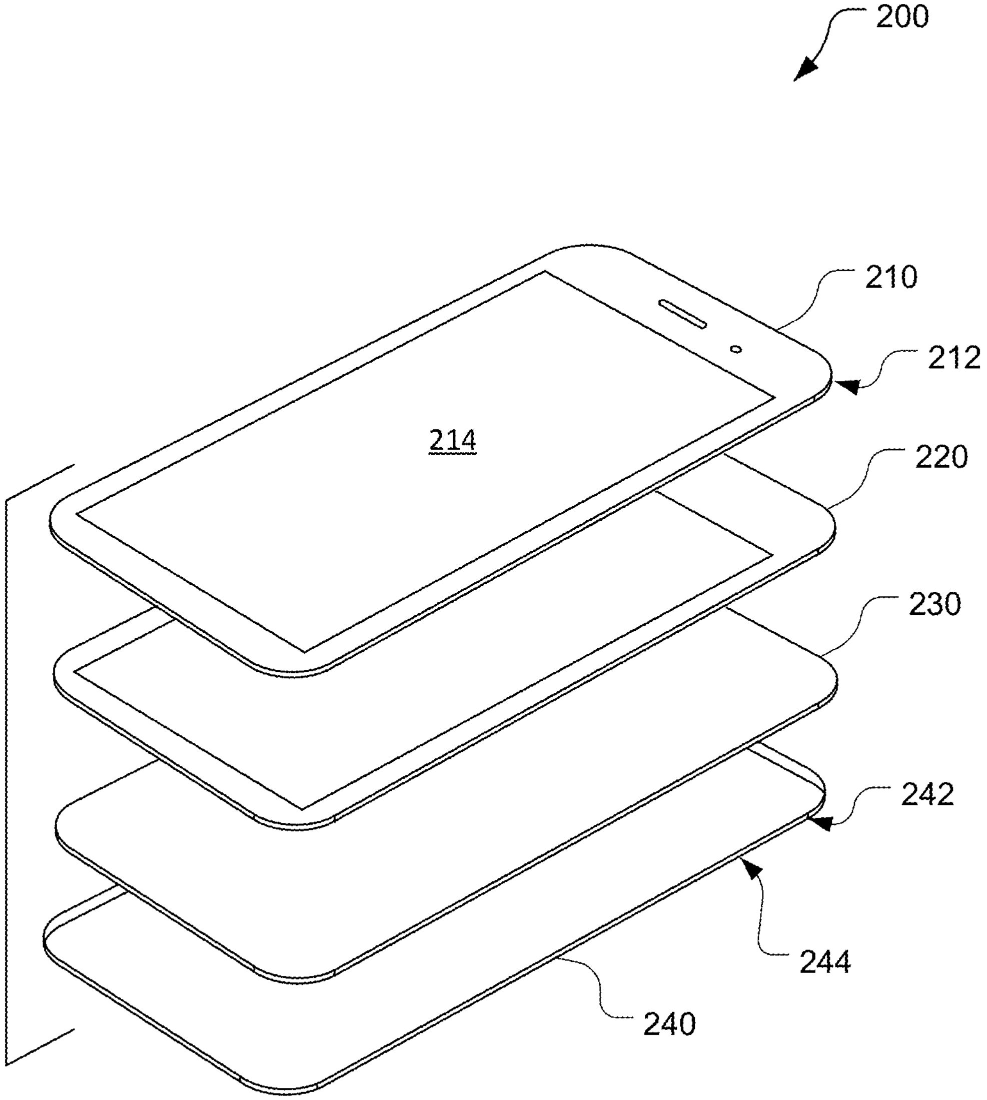
FIG. 2 is an exploded perspective view of simplified components of a mobile device shown in FIG. 1.

Referring to FIG. 2, a mobile device 200, which is an example of one of the mobile devices 112 shown in FIG. 1, includes a top cover 210, a display layer 220, a printed circuit board (PCB) layer 230, and a bottom cover 240. The mobile device 200 as shown may be a smartphone or a tablet computer but embodiments described herein are not limited to such devices (for example, in other implementations of concepts described herein, a device may be a router or customer premises equipment (CPE)). The top cover 210 includes a screen 214. The bottom cover 240 has a bottom surface 244. Sides 212, 242 of the top cover 210 and the bottom cover 240 provide an edge surface. The top cover 210 and the bottom cover 240 comprise a housing that retains the display layer 220, the PCB layer 230, and other components of the mobile device 200 that may or may not be on the PCB layer 230. For example, the housing may retain (e.g., hold, contain) or be integrated with antenna systems, front-end circuits, an intermediate-frequency circuit, and a processor discussed below. The housing may be substantially rectangular, having two sets of parallel edges in the illustrated embodiment, and may be configured to bend or fold. In this example, the housing has rounded corners, although the housing may be substantially rectangular with other shapes of corners, e.g., straight-angled (e.g., 45°) corners, 90°, other non-straight corners, etc. Further, the size and/or shape of the PCB layer 230 may not be commensurate with the size and/or shape of either of the top or bottom covers or otherwise with a perimeter of the device. For example, the PCB layer 230 may have a cutout to accept a battery. Further, the PCB layer 230 may include sandwiched boards and/or a PCB daughter board. Daughter boards may be chosen to facilitate a design and/or manufacturing process, e.g., to reinforce a functional separation or to better utilize a space in the housing. Embodiments of the PCB layer 230 other than those illustrated may be implemented.

The limited space available in a UE (e.g., a smartphone, tablet computer, etc.) presents antenna design challenges. For example, with 10 or more antennas for LTE and sub-6 GHz band in a mobile phone, there may be no additional space available for another antenna. Because antenna frequency bandwidth varies with antenna size, with small antennas typically having narrow bandwidths, designing a stand-alone antenna to cover a wide frequency bandwidth is challenging. Further, mechanical stability of a UE (e.g., a mobile phone) may be challenging, e.g., because non-conductive (e.g., plastic) breaks in a metal frame of the UE may be needed to separate antennas, but may weaken stability of the frame and may result in thermal issues due to an inability to dissipate heat.

Figure 3:
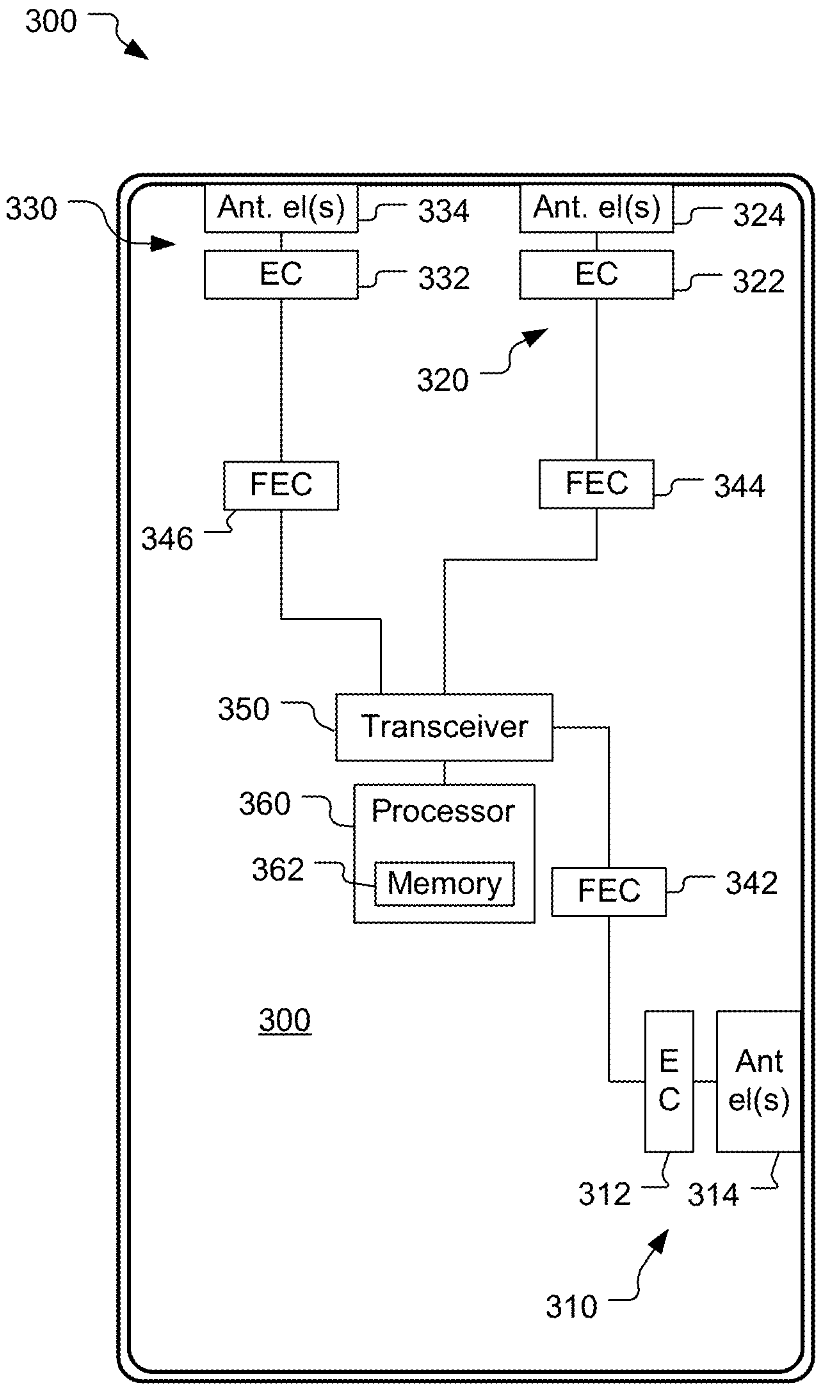
FIG. 3 is a plan view of an apparatus including antenna systems.

Referring also to FIG. 3, an apparatus 300 includes antenna systems 310, 320, 330. The apparatus 300 may be an example of the mobile device 200. This is an example, and other types of apparatus may be used and/or other quantities of antennas may be provided in the apparatus 300. For example, the apparatus 300 may be an access point or a portion thereof, a base station or a portion thereof, or any number of other devices or portions thereof. As another example, some present smartphones include eight (8) or more antennas, e.g., 11 or more antennas. Each of the antenna systems 310, 320, 330 includes one or more energy couplers 312, 322, 332, and one or more antenna elements 314, 324, 334, respectively. Each of the one or more energy couplers 312, 322, 332 is coupled to a front-end circuit (FEC) 342, 344, 346. The front-end circuits 342, 344, 346 (also called radio frequency (RF) circuits) are coupled to a transceiver 350, which is coupled to a processor 360 including a memory 362. The memory 362 may be a non-transitory, processor-readable storage medium that includes software with processor-readable instructions that are configured to cause the processor 360 to perform functions (e.g., possibly after compiling the instructions). The processor 360 may be implemented as a modem or a portion thereof. The processor 360 is communicatively coupled to the transceiver 350, which is communicatively coupled to the front-end circuits 342, 344, 346, which are communicatively coupled to the ECs 312, 322, 332, which are communicatively coupled to antenna elements of the antenna systems 310, 320, 330.

The front-end circuits 342, 344, 346 may be configured to provide one or more signals to be radiated by antenna elements of the antenna systems 310, 320, 330 and/or to receive and process one or more signals that are received by, and provided to the front-end circuits 342, 344, 346 from respective antenna elements of the antenna systems 310, 320, 330. One or more of the front-end circuits 342, 344, 346 may include a respective matching circuit to facilitate transfer of signals from the FECs 342, 344, 346 to the ECs 312, 322, 332 and from the ECs 312, 322, 332 to the FECs 342, 344, 346. The front-end circuits 342, 344, 346 may be configured to process (e.g., amplify, route, filter, etc.) RF signals received from the transceiver 350 or antenna elements of the antenna systems 310, 320, 330, for example without significantly adjusting a frequency thereof.

One or more of the antenna systems 310, 320, 330 may be configured to operate at various frequencies. For example, one or more of the antenna systems 310, 320, 330 may be configured to operate over the n258, n261, n257, n260, and n259 frequency bands.

Numerous implementation examples of the antenna systems 310, 320, 330 are possible. Different implementations may be used depending, for example, on one or more desired performance characteristics and/or one or more design constraints (e.g., one or more antenna system locations). For example, one or more of the antenna systems 310, 320, 330 may be configured for dual polarization operation.

Figure 4:
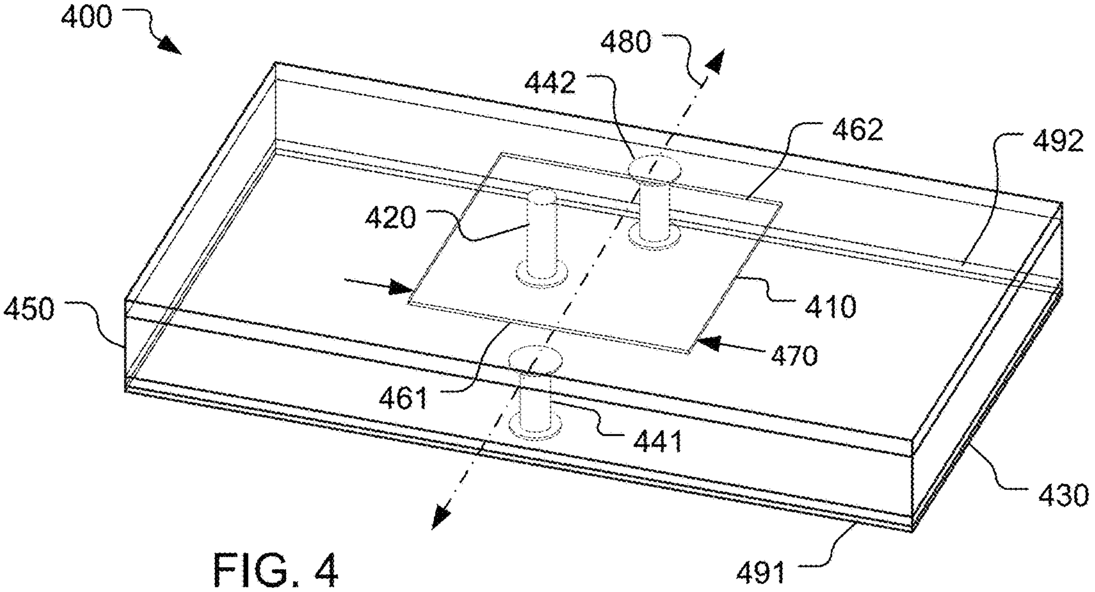
FIG. 4 is a perspective view of an example antenna system.
Figure 5:
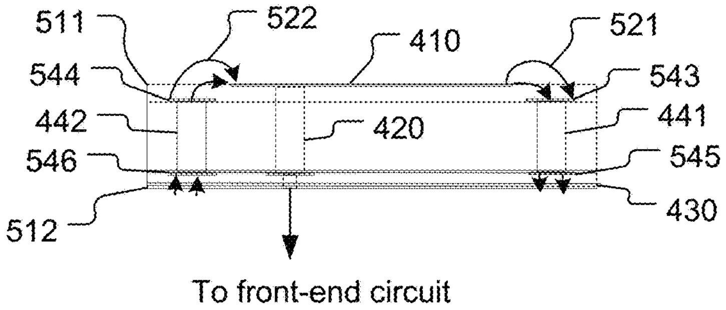
FIG. 5 is a side plan view of the antenna system shown in FIG. 4.

Referring also to FIGS. 4 and 5, an antenna system 400 is an example of one of the antenna systems 310, 320, 330, and includes a patch antenna element 410, an energy coupler 420, a ground conductor 430, floating conductors 441, 442, and one or more layers of dielectric material 450. The patch antenna element 410 and the ground conductor 430 are disposed at respective levels of the antenna system 400, e.g., in or on corresponding layers of a circuit board such as the PCB 230. Different layers of the circuit board may comprise different materials, and a single layer may comprise multiple materials (e.g., a dielectric material and an electrically-conductive material such as of the patch antenna element 410). For example, the dielectric material 450 may include layers of materials each with relative permittivity between 3.7 and 4.2, although materials with other relative permittivity may be used. Active layers of a circuit board may be provided on a side of the ground conductor 430 opposite of the patch antenna element 410. In the example shown in FIGS. 4 and 5, the patch antenna element 410 is disposed at a first level 511 of the antenna system 400 and the ground conductor 430 is disposed at a second level 512 of the antenna system 400. The energy coupler 420 is a probe feed that is communicatively coupled to a front-end circuit (not shown). The energy coupler 420 is also connected to the patch antenna element 410 at a location in order to induce single-polarization operation (i.e., to transmit and/or receive signals of one polarization) of the antenna system 400.

The floating conductors 441, 442 are displaced from the ground conductor 430 (also called a ground plane) and the patch antenna element 410, and thus not electrically connected to either the ground conductor 430 or the patch antenna element 410. The floating conductors 441, 442 are thus "floating" because they are not electrically connected to either the ground conductor 430 or the patch antenna element 410. The floating conductors 441, 442. In this example, the floating conductors 441, 442 are metalized vias through a portion of the dielectric material 450. The floating conductors 441, 442 extend between the first level 511 of the patch antenna element 410 and the second level 512 of the ground conductor 430, in this example, being entirely disposed between the first level 511 and the second level 512. The floating conductors 441, 442 may include pads 543, 544 at one end of the floating conductors 441, 442 closer to the first level 511 (of the patch antenna element 410) than the second level 512 (of the ground conductor 430) and/or may include pads 545, 546 at another end of the floating conductors 441, 442 closer to the second level 512 than the first level 511.

The floating conductors 441, 442 may be disposed in close proximity to respective edges 461, 462 of the patch antenna element 410. For example, the floating conductors 441, 442 may be disposed adjacent to the respective edges 461, 462 of the patch antenna element 410. The pads 543, 544 may, for example, may be disposed within about $0.025\lambda_0$ of the edges 461, 462. The pads 543, 544 may overlap with the patch antenna element 410, e.g., overlapping by about $0.01\lambda_0$ or less, where $\lambda_0$ is the free-space wavelength (e.g., at 24.25 GHz). The pads 543, 544 may, as in this example, be disposed in a metallic layer just below the patch antenna element 410, but the floating conductors 441, 442 may be configured such that the pads 543, 544 are disposed elsewhere, e.g., in a same layer as the patch antenna element 410 (e.g., as with pads and a patch antenna element discussed below with respect to FIGS. 7 and 8). The floating conductors 441, 442 may be disposed relative to the patch antenna element 410 to intersect fringing fields 521, 522, being disposed in a volume that would be occupied by fringing fields produced by the patch antenna element 410 and the ground conductor 430. The floating conductors 441, 442 may be configured and disposed to conduct energy of the fringing fields 521, 522, with the floating conductor 441 configured and disposed to receive, conduct, and emit the fringing field 521 and the floating conductor 442 configured and disposed to receive, conduct, and emit the fringing field 522. The floating conductors 441, 442 may be centered along the edges 461, 462 (disposed midway along a length 470 of the antenna element 410, along a centerline 480 of the antenna element 410). The floating conductors 441, 442 help implement a field localization technique that helps contain fields of the patch antenna element 410 near to the patch antenna element 410. The floating conductors 441, 442 may thus comprise means for localizing fringing fields of the patch antenna element 410 closer to the patch antenna element 410 than without the floating conductors 441, 442.

Figure 6:
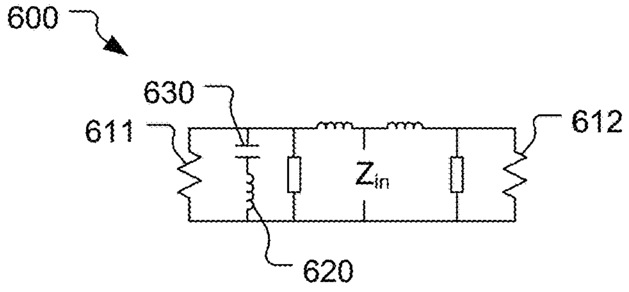
FIG. 6 is an equivalent circuit diagram of the antenna system shown in FIG. 4.

The floating conductors 441, 442 may be configured and disposed to have little effect on matching between the antenna element 410 and the energy coupler 420 (and the front-end circuit). For example, referring also to FIG. 6, and equivalent circuit 600 of the antenna system 400 includes resistors 611, 612 corresponding to radiating slots provided by the edges 461, 462 of the patch antenna element 410 and the ground conductor 430, and an inductor 620 (L) and a capacitor 630 (C) coupled in series, with the series-coupled LC being in parallel with the resistors 611, 612 corresponding to the radiating edges. The floating conductors 441, 442 may improve polarization performance. The series-coupled LC may be considered as an extra parameter in controlling a degenerated electric field component amplitude and/or phase. This may result in improved cross-polarization performance (e.g., cross-polarization isolation) of the patch antenna element 410.

The floating conductors 441, 442 may be disposed in close proximity to edges 491, 492 of the antenna system 400, such that the edges 461, 462 may be significantly displaced from the edges 491, 492 such that radiation by the antenna element 410 may be concentrated away from the edges 491, 492, thus avoiding undesired radiation in undesired directions (e.g., directly away from the edges 491, 492).

Use of the floating conductors 441, 442 may help reduce a size of the antenna system 400 and improve performance of the antenna system 400. For example, the antenna system 400 may provide dual-polarized, penta-band operation, e.g., for a 5G phased array with acceptable scan angle performance of +/−450 (e.g., with at least a threshold gain) over the n258, n261, n257, n260, and n259 frequency bands (i.e., the penta bands). Without the floating conductors 441, 442, the patch antenna element 410 may need to be larger to deliver similar gain and frequency response for the same frequency of operation than with the floating conductors 441, 442 (e.g., similar back-lobe radiation, mutual coupling, cross-polarization, and/or to polarization orthogonality).

Other quantities of floating conductors may be used. For example, one of the floating conductors 441, 442 may be omitted. As another example, more than two floating conductors may be used, which may help reduce a size of a patch antenna element and thus of an antenna assembly including one or more of the patch antenna elements (e.g., as discussed further below).

Figure 7:
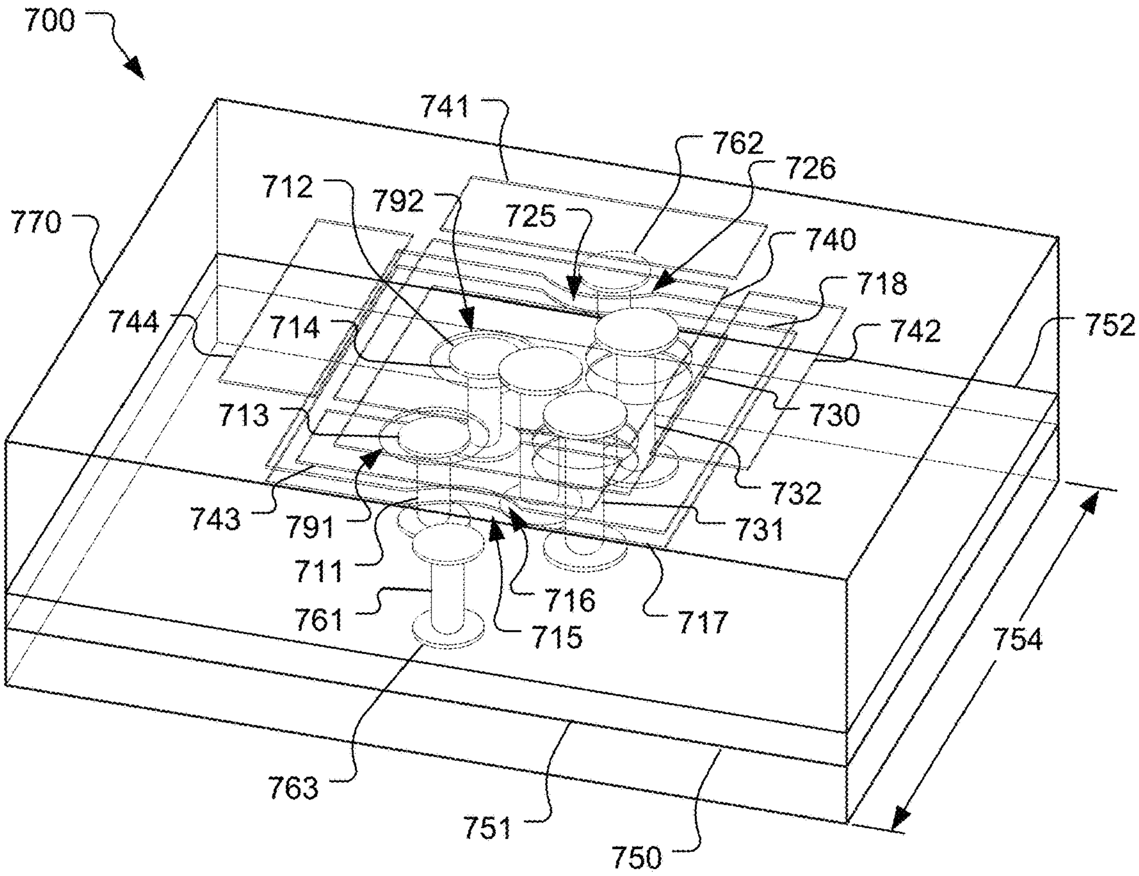
FIG. 7 is a perspective view of another example antenna system.
Figure 8:
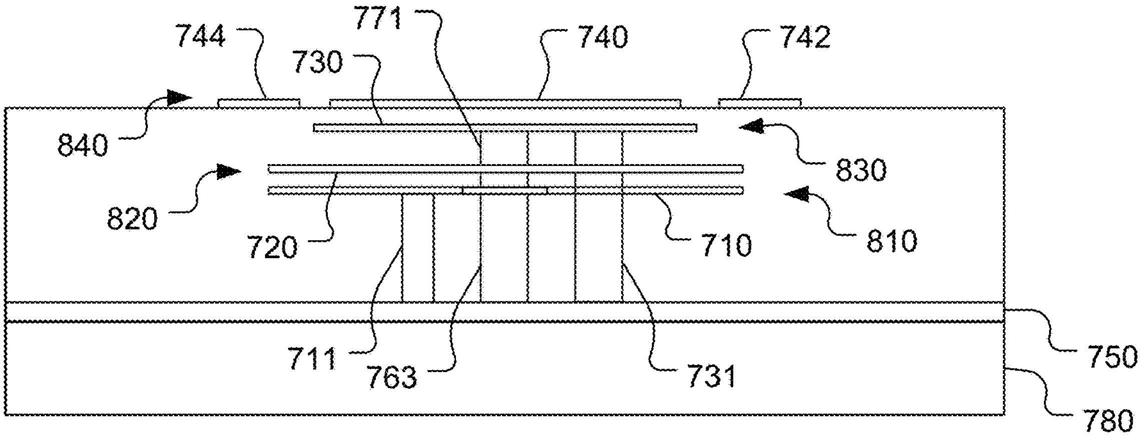
FIG. 8 is a side plan view of the antenna system shown in FIG. 7.

Referring to FIGS. 7 and 8, a dual-polarized antenna system 700 is configured for operation in multiple frequency bands. Items, or portions thereof, are shown in FIG. 7 as being transparent or non-transparent to help clarity of the figure. The antenna system 700 includes low-band patches 710, 720, high-band patches 730, 740, low-band energy couplers 711, 712, high-band energy couplers 731, 732, parasitic elements 741, 742, 743, 744, a ground conductor 750, floating conductors 761, 762, a body 770 (comprising a dielectric material), a shorting conductor 771, and active layers 780.

Although not shown, there may be a gap between the ground conductor 750 and the active layers 780. The ground conductor 750, the low-band patch 710, the low-band patch 720, the high-band patch 730, and the high-band patch 740 may be disposed at respective levels of the antenna system 700, although different layers are not shown for the sake of clarity of the figures. A level 810 of the low-band patch 710 is between a level 820 of the low-band patch 720 and the ground conductor 750, the level 820 of the low-band patch 720 is between the level 810 of the low-band patch 710 and a level 830 of the high-band patch 730, and the level 830 of the high-band patch 730 is between the level 820 of the low-band patch 720 and a level 840 of the high-band patch 740. A dielectric material may overlie the high-band patch 740 but is not shown in FIG. 8.

The low-band patches 710, 720 are configured for operation with (transmission and/or reception of) lower frequency signals than the high-band patches 730, 740. For example, the low-band patches 710, 720 may be configured for operation with (e.g., transmission and/or reception of) signals with frequencies between 24.25 GHz and 29.5 GHz and the high-band patches 730, 740 may be configured for operation with signals with frequencies between 37.0 GHz and 43.5 GHz. The low-band patch 710 is approximately square, is capacitively fed by the low-band energy couplers 711, 712, with pads 713, 714 of the low-band energy couplers 711, 712 being disposed in openings 791, 792 defined by the low-band patch 710. The low-band energy couplers 711, 712 are coupled to the low-band patch 710 at locations to enable dual-polarization operation (transmission and/or reception) by the low-band patch 710. The low-band patch 720 overlaps with, is co-centered with, and is disposed close enough to the low-band patch 710 to be capacitively coupled to the low-band patch 710 to help improve low-band (i.e., lower frequency than for the high-band patches 730, 740) performance. The low-band patches 710, 720 are approximately, if not exactly, the same size and shape. The low-band patches 710, 720 define recesses 715, 716, 725, 726, respectively, that each extend inwardly from a respective edge of the respective low-band patch 710, 720, e.g., from edges 717, 718 of the low-band patch 710 (edges of the low-band patch 720 are not labeled for sake of clarity of the figure). Here, the recesses 715, 716, 725, 726 have arcuate shapes, but other shapes of recesses may be used (i.e., defined by the low-band patches 710, 720). The recesses 715, 716, 725, 726 are aligned with the floating conductors 761, 762 and are configured to maintain at least a threshold separation between the low-band patches 710, 720 and the floating conductors 761, 762.

Figure 15:
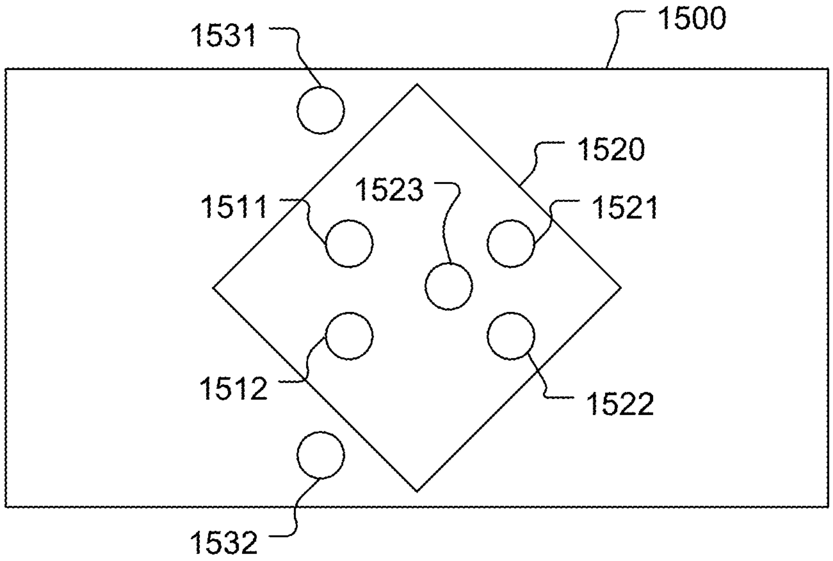
FIG. 15 is a top view of edge-fed stacked patch antenna system.

Similar to the floating conductors 441, 442, the floating conductors 761, 762 are displaced from the ground conductor 750 and the low-band patch 710, and thus not electrically connected to either the ground conductor 750 or the low-band patch 710 (or the low-band patch 720). Also similar to the floating conductors 441, 442, the floating conductors 761, 762 may be disposed in close proximity to respective edges 717, 718 of the low-band patch 710. The floating conductors 761, 762 may be disposed proximate to edges 751, 752 of the ground conductor 750 (which may be edges of the antenna system 700 (e.g., of the body 770)) to help capture and localize electric fields of the low-band patch 710 (and possibly the low-band patch 720) near to the edges of the low-band patch 710. This may considerably improve cross-polarization performance of the antenna system 700, with the ground conductor 750 having a short width 754, e.g., by balancing the amplitude of two degenerated modes and correcting non-orthogonality of the modes (e.g., due to amplitudes of fields of different directions being unequal and/or due to direction(s) of one or both of the fields being different than the respective desired direction(s)). The floating conductors 761, 762 may be, as in this example, centered along lengths of respective edges of the low-band patch 710 (similar to the positioning of the floating conductors 441, 442). Upper pads of the floating conductors 761, 762 are disposed at the same level as the low-band patch 710, although other configurations may be used (e.g., with the upper pads being disposed at a level between the level of the low-band patch 710 and the ground conductor 750 (e.g., close to the level of the low-band patch 710)). In an edge-fed stacked patch antenna system, floating conductors may be offset from the center of a respective patch edge to correct the cross-polarization performance by localizing the fields and suppressing an undesired degenerated mode. For example, as shown in FIG. 15, an edge-fed stacked patch antenna system 1500 includes low-band energy couplers 1511, 1512, a high-band patch 1520, high-band energy couplers 1521, 1522, a shorting pin 1523, floating conductors 1531, 1532, and a dielectric material 1540. The antenna system 1500 includes other features that are not shown for sake of clarity of the figure. Also, all items are shown in solid lines even though they may be hidden behind one or more other items (e.g., the low-band energy couplers 1511, 1512 being hidden behind the high-band patch 1520 and possibly one or more other patches).

The high-band patches 730, 740 are configured for operation with higher frequency signals than the low-band patches 710, 720. For example, the high-band patches 730, 740 may be approximately square and smaller than the low-band patches 710, 720, and the high-band patches 730, 740 may be approximately, if not exactly, the same size. The high-band patch 730 is directly fed by the high-band energy couplers 731, 732 (that are directly electrically connected to the high-band patch 730), with the energy couplers 731, 732 passing through openings (not labeled for sake of clarity of the figures) defined by the low-band patches 710, 720, respectively. The energy couplers 731, 732 are coupled to the high-band patch 730 at locations to enable dual-polarization operation (transmission and/or reception) by the high-band patch 730. The high-band patch 740 is capacitively coupled to the high-band patch 730 to help improve high-band antenna performance. The parasitic elements 741, 742, 743, 744 are disposed at the same level of the antenna system 700 as the high-band patch 740, i.e., the level 840, and are configured and disposed to help improve high-band antenna performance (e.g., increase gain and/or bandwidth of the high-band patch 730). In this example, the parasitic elements 741, 742, 743, 744 comprise rectangularly-shaped conductors, each of a length approximately equal to a respective edge of the high-band patch 740 and each disposed in close proximity to a respective edge of the high-band patch 740.

The shorting conductor 771 is configured, disposed, and connected to improve cross-polarization performance of the antenna system 700. The shorting conductor 771 is electrically connected to the ground conductor 750 and to the high-band patch 730, e.g., at a center of the high-band patch 730 as shown.

Use of the floating conductors 761, 762 may improve antenna performance. Simulations have shown that use of the floating conductors 761, 762 reduced radiation at undesired locations of the antenna system 700, e.g., at corners of one or more of the patches 710, 720, 730, 740. This may be due to field localization induced by the floating conductors 761, 762 inhibiting fields from reaching patch edges from which radiation is undesired. The floating conductors 761, 762 may be disposed in close proximity to respective outer edges of the antenna system 700, e.g., in close proximity to respective outer edges 751, 752 of the ground conductor 750. For example, the floating conductors 761, 762 may be disposed as close to the edges 751, 752 as manufacturing techniques for making the antenna system 700 allow, e.g., with a bottom pad 763 being within 0.2λ or within 0.2 mm of the edge 751.

Figure 9:
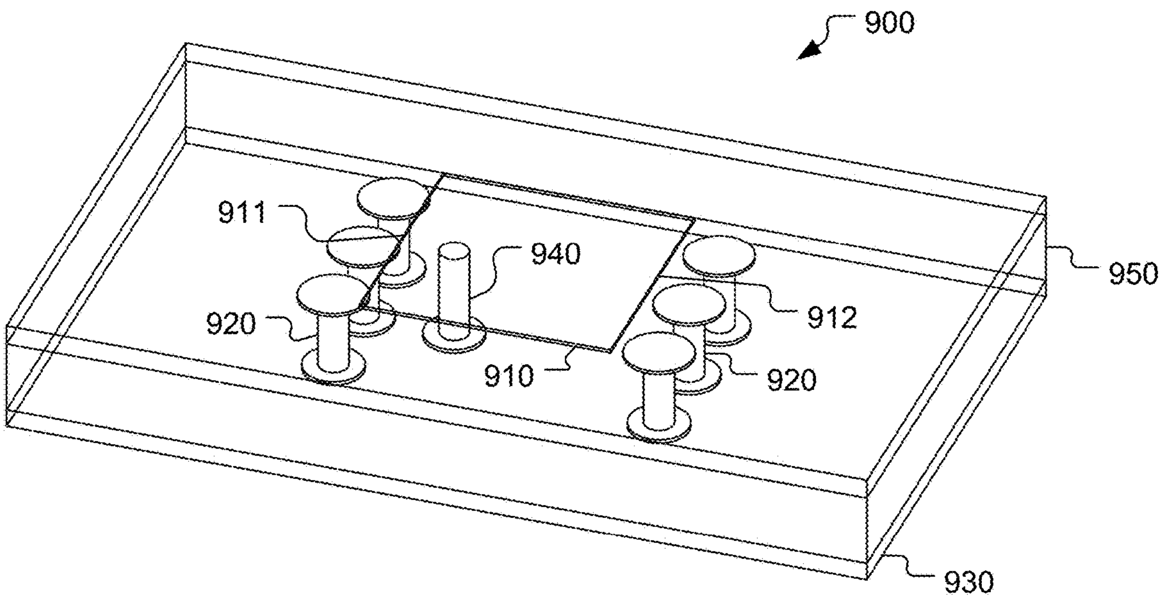
FIG. 9 is a perspective view of another example antenna system.

Referring to FIG. 9, with further reference to FIGS. 3-6, an antenna system 900 is another example of any of the antenna systems 310, 320, 330, and includes a patch antenna element 910, floating conductors 920, a ground conductor 930, an energy coupler 940, and a body 950 (comprising one or more layers of one or more dielectric materials). In this example, the antenna system 900 includes multiple ones of the floating conductors 920 disposed along and in close proximity to (e.g., to intersect with fringing fields from/to) each of multiple edges of the patch antenna element 910, here along edges 911, 912 of the patch antenna element 910. The floating conductors 920 may extend between levels of the ground conductor 930 and the patch antenna element 910, e.g., without reaching the ground conductor 930. The floating conductors 920 may reach a level of the patch antenna element 910, or (as shown) may not reach such level, thus extending between the level of the ground conductor 930 and the level of the patch antenna element 910. Two or more of the floating conductors 920 may be connected, e.g., floating conductors 920 disposed along a same edge of the patch antenna element 910 may be electrically connected to each other. In this example, the floating conductors 920 are disposed symmetrically along each of the edges 911, 912. The antenna system 900 is a single-polarized patch antenna system, with the edges 911, 912 being radiating edges (edges capable of emitting and/or receiving wireless signals) and with the floating conductors 920 disposed along the radiating edges. In this example, there are three of the floating conductors 920 disposed along each of the edges 911, 912, but other quantities of floating conductors may be disposed along an edge of a patch antenna element. The energy coupler 940 may be electrically connected to the patch antenna element 910 and may be disposed at different locations relative to the patch antenna element 910 to induce desired radiation (e.g., v-h (vertical-horizontal) polarization) parallel to edges of the antenna element 910.

Figure 10:
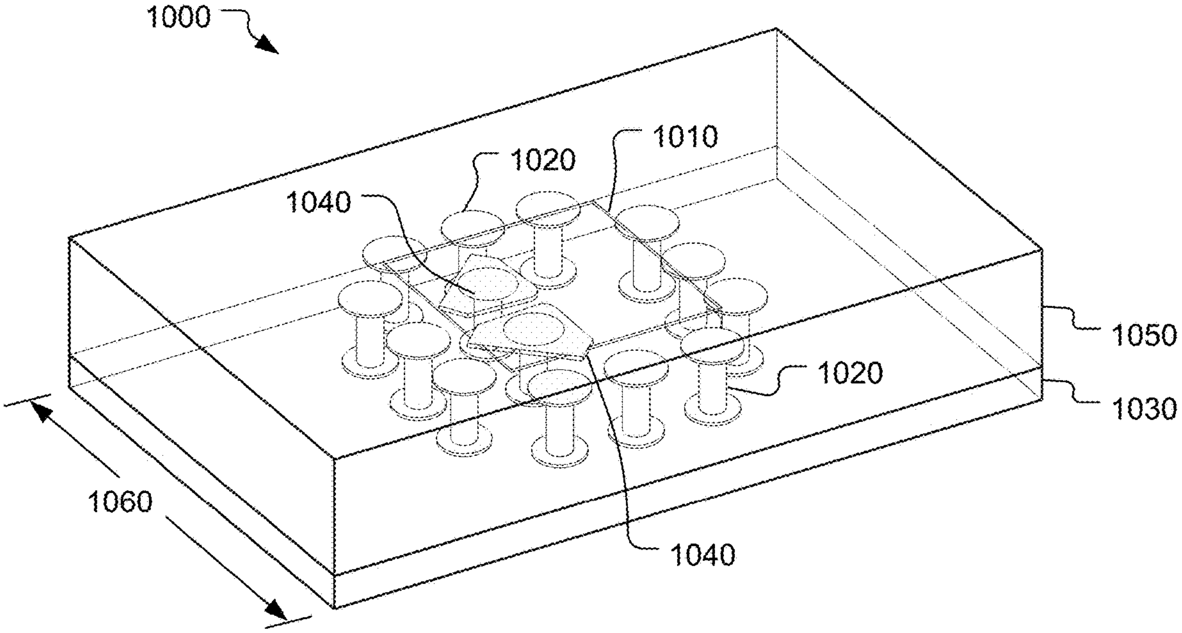
FIG. 10 is a perspective view of another example antenna system.
Figure 11:
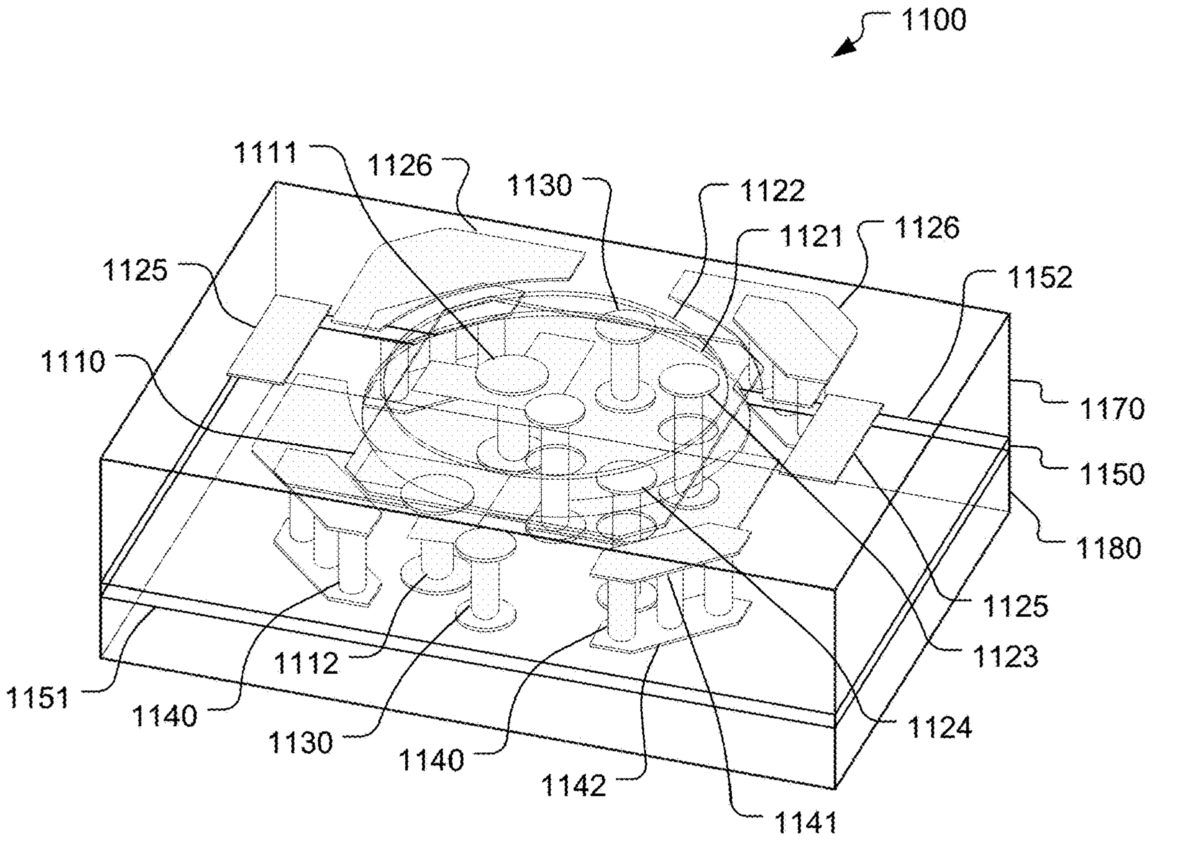
FIG. 11 is a perspective view of another example antenna system.

The floating conductors 920 may introduce a series LC circuit in parallel with radiating slots provided by radiating edges of the patch antenna element 910 and the ground conductor 930. The LC circuit may increase an effective capacitance of the patch antenna element 910 and accordingly decrease a resonant frequency of the patch antenna element 910 such that the patch antenna element 910 may be smaller for a given frequency of operation than without the floating conductors 920. The series-coupled LC circuit may be considered as an extra parameter in controlling a degenerated electric field component amplitude and/or phase. This may enable the patch antenna element 910 to be smaller than without the floating conductors 920 for radiating and/or receiving signals of the same frequency (ies). For example, to radiate and/or receive signals of a particular frequency, a patch antenna element may typically be about 0.52 at that frequency whereas the patch antenna element 910 may be, in this example, a square patch that is less than 0.52 on each side due to the floating conductors 920, which may increase an effective capacitance of the patch antenna element 910 due to the LC circuit introduced by the floating conductors 920 (or by using floating conductors near more than two sides of a (square) patch antenna element, e.g., as shown in FIGS. 10 and 11). For example, the patch antenna element 910 may be a square, with lengths of sides reduced by about 31% by using the floating conductors 920 compared to not using the floating conductors 920. The floating conductors 920 may thus comprise means for increasing the effective capacitance of the patch antenna element 910.

The antenna system 900 is an example, and other configurations may be used, e.g., with floating conductors disposed along and adjacent to more than two edges of a patch antenna element. For example, referring also to FIG. 10, an antenna system 1000 includes a patch antenna element 1010, floating conductors 1020, a ground conductor 1030, energy couplers 1040, and a body 1050 (comprising one or more layers of one or more dielectric materials). In this example, the floating conductors 1020 are disposed along and in close proximity to (e.g., to intersect with fringing fields from/to) all four sides of the patch antenna element 1010, which in this example is a square patch antenna element. The floating conductors 1020 may extend between levels of the ground conductor 1030 and the patch antenna element 1010, e.g., without reaching either of the levels of the ground conductor 1030 and the patch antenna element 1010, or may reach a level of the patch antenna element 1010. Two or more of the floating conductors 1020 may be connected, e.g., floating conductors 1020 disposed along a same edge of the patch antenna element 1010 may be electrically connected to each other. The floating conductors 1020 may introduce a series LC circuit in parallel with radiating slots provided by radiating edges (edges capable of radiating and/or receiving wireless signals) of the patch antenna element 1010 and the ground conductor 1030. The LC circuit may increase an effective capacitance of the patch antenna element 1010 and accordingly decrease a resonant frequency of the patch antenna element 1010 such that the patch antenna element 1010 may be smaller for a given frequency of operation than without the floating conductors 1020. Simulations of the antenna system 1000 showed, compared to a similar antenna system without the floating conductors 1020, improved field localization, improved cross-polarization, and improved coupling, with similar total antenna efficiency and bandwidth. For example, for a layered antenna system configuration with dielectric material(s) with relative permittivity below about 4.2, the antenna system 1000 may have a width 1060 of less than about 3 mm (e.g., 2.8 mm or less) for operation between about 24 GHz and about 43 GHz without significantly reducing antenna bandwidth and/or antenna efficiency compared to antenna systems without floating conductors.

Figure 12:
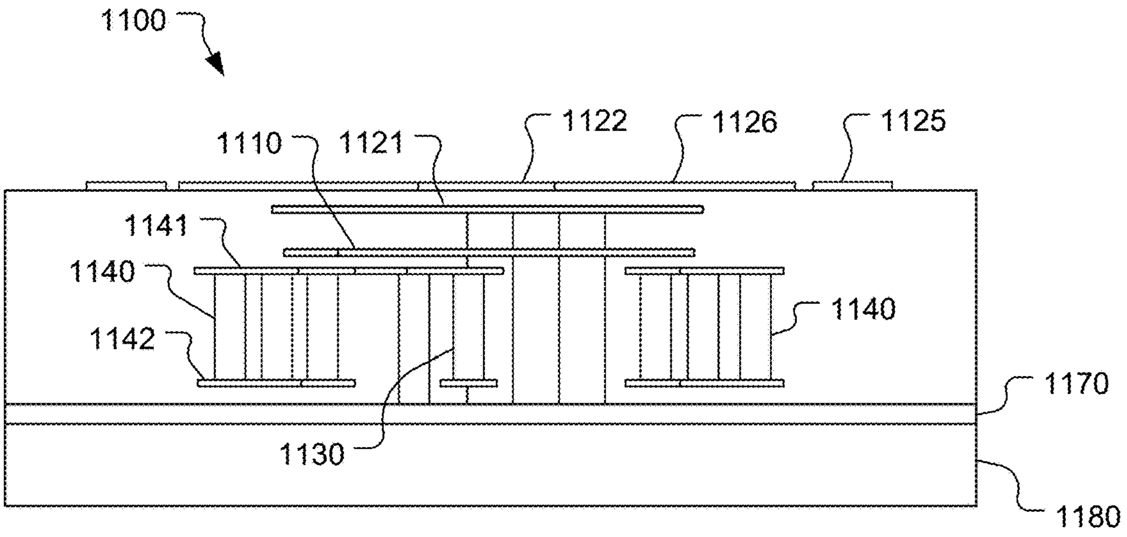
FIG. 12 is a side plan view of the antenna system shown in FIG. 11.
Figure 13:
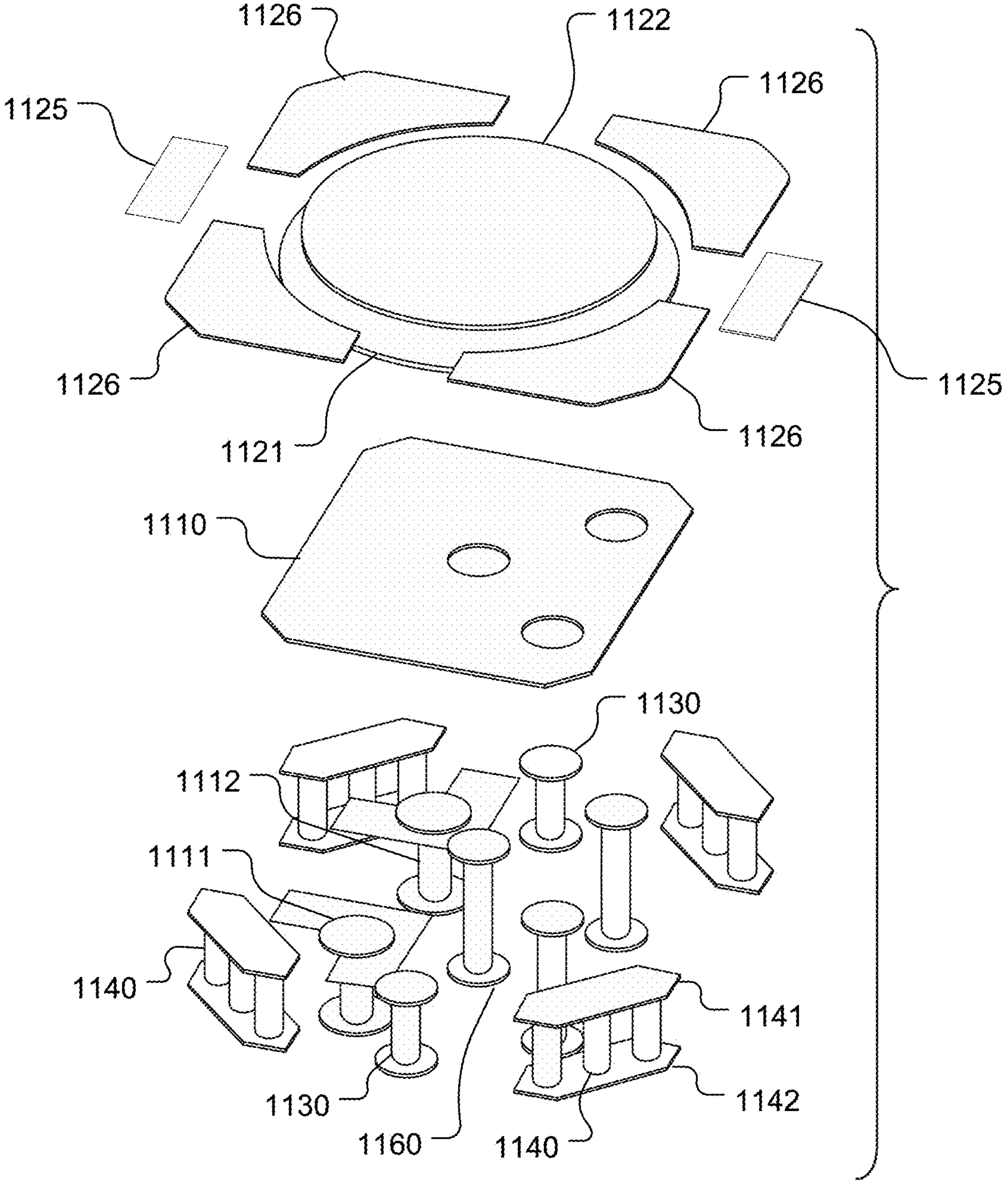
FIG. 13 is a perspective exploded view of the antenna system shown in FIG. 11.

Referring to FIGS. 11-13, with further reference to FIG. 9, an antenna system 1100 includes a low-band patch antenna element 1110, high-band patch antenna elements 1121, 1122, floating conductors 1130, 1140, a ground conductor 1150, low-band energy couplers 1111, 1112, high-band energy couplers 1123, 1124, parasitic elements 1125, 1126, a shorting conductor 1160, a body 1170 (comprising one or more layers of one or more dielectric materials), and active layers 1180. The antenna system 1100 is an example of the antenna system 900 with dual polarization, slant polarization. In this example, the floating conductors 1140 comprise four sets of three of the floating conductors 1140. In each of the sets of the floating conductors 1140, the floating conductors 1140 are electrically connected, here with pads 1141, 1142 at respective ends of the floating conductors 1140. Each of the four sets of the floating conductors 1140 is disposed at a respective corner area of the low-band patch antenna element 1110, with the pads 1141 being at the same level as the low-band patch antenna element 1110 (although other configurations, e.g., with the pads 1141 below the level of the low-band patch antenna element 1110 (toward the ground conductor 1150), may be used). The low-band patch antenna element 1110 is, in this example, a square patch antenna element with corners truncated due to the floating conductors 1140. The low-band patch antenna element 1110 thus is, in this example, an eight-sided patch antenna element. The floating conductors 1130 are disposed in close proximity to two edges of the patch antenna element 1110, centered along the edges. The floating conductors 1130 are disposed adjacent to edges 1151, 1152 of the ground conductor 1150, and thus adjacent to width boundaries of the antenna system 1100 (or width boundaries of a linear array of the antenna systems 1100, e.g., as discussed below). The floating conductors 1130 may be disposed as close as possible (within manufacturing capabilities) of the edges 1151, 1152 (e.g., within 0.2λ or within 0.2 mm of the edges 1151, 1152). The floating conductors 1130 have been shown in simulations to improve cross-polarization of the antenna system 1100 compared to a similar antenna system without the floating conductors 1130. Simulations have also shown that the floating conductors 1140 improve cross-polarization and allow for significant size reduction of a radiating patch antenna element near the floating conductors 1140, here the low-band patch antenna element 1110, by effectively increasing capacitance of the antenna element 1110. The floating conductors 1140 may provide for patch antenna element size reduction while improving radiation performance in terms of coupling between ports in the antenna element, cross-polarization, and polarization orthogonality, e.g., by localizing fields at appropriate locations. Simulations have also shown that the parasitic elements 1125 improved polarization performance (e.g., cross-polarization, polarization orthogonality, and/or polarization isolation).

The low-band energy couplers 1111, 1112 may comprise L-shaped pads configured and disposed to provide proximity feeds for (capable of supplying energy to and/or receiving energy from) the low-band patch antenna element 1110. For example, L-shaped pads 1113, 1114 (labeled in FIG. 13) of the low-band energy couplers 1111, 1112 may be displaced from, but close enough to, the low-band patch antenna element 1110 to capacitively couple to the antenna element 1110. The low-band energy couplers 1111, 1112 and the high-band energy couplers 1123, 1124 may be coupled to one or more respective front-end circuits, in the active layers 1180, including different respective matching networks for the low-band patch antenna element 1110 and the high-band patch antenna elements 1121, 1122. The matching network for the low-band patch antenna element 1110 may not include any open stubs to avoid reflected fields in a high-band frequency range (and therefore re-radiation of an undesired mode) that may degrade performance of the high-band patch antenna elements 1121, 1122 in terms of polarization purity and gain/efficiency.

The low-band patch antenna element 1110 and the high-band patch antenna elements 1121, 1122 may be configured for operation in different frequency bands, e.g., 24.25 GHz-29.5 GHz and 37.0 GHz-43.5 GHz, respectively. For example, the low-band patch antenna element 1110 may be larger than the high-band patch antenna elements 1121, 1122. The high-band energy couplers 1123, 1124 may be probe couplers electrically connected to the high-band patch antenna element 1121, and the high-band patch antenna element 1122 may be disposed and configured to capacitively couple to the high-band patch antenna element 1121. The parasitic elements 1125, 1126 may be configured and disposed to improve antenna performance (e.g., gain, efficiency) of the high-band patch antenna elements 1121, 1122. The parasitic elements 1125, 1126 may, as in this example, be disposed in the same level of the antenna system 1100 as an associated patch antenna element, in this example the high-band patch antenna element 1122. The floating conductors 1130 and/or the floating conductors 1140 may be, as in this example, entirely disposed between the level of the ground conductor 1150 and the level of the parasitic elements 1125, e.g., the level of the patch antenna element associated with the parasitic elements 1125. The parasitic elements 1125 in this example are disposed on opposite sides of the high-band patch antenna element 1122 and outside of the parasitic elements 1125. The parasitic elements 1125 are disposed symmetrically about the high-band patch antenna element 1122 in this example. The high-band patch antenna elements 1121, 1122 have circular shapes in this example, but other shapes of high-band (and/or low-band) patch antenna elements may be used. Further, while there are two of the parasitic elements 1125 and four of the parasitic elements 1126 in this example, other quantities of parasitic elements (including no parasitic elements 1125 and/or no parasitic elements 1126) may be used. Further, shapes of the parasitic elements 1125, 1126 are examples and other shapes of parasitic elements may be used. The floating conductors 1130 and/or the floating conductors 1140 may be, as in this example, entirely disposed between the level of the ground conductor 1150 and the level of the lowest patch antenna fed by an energy coupler (as opposed to being capacitively-coupled-fed by another patch antenna). Thus, in this example, the floating conductors 1130 and/or the floating conductors 1140 may be disposed between the level of the ground conductor 1150 (without being connected to the ground conductor 1150) and up to or below the level of the low-band patch 1110 (i.e., extending to the level of the low-band patch 1110 or extending less than to the level of the low-band patch 1110). As another example, floating conductors may be extend from a level separated from a ground conductor up to (or less than to) a level of an energy-coupler-fed patch antenna element associated with the floating conductors, and less than to a level of a patch antenna capacitively coupled to the patch antenna element associated with the floating conductors. The patch antenna element that is associated with the floating conductors is a patch antenna element configured and disposed relative to the floating conductors such that fringing fields of the patch antenna element will be intersected by the floating conductors.

Figure 14:
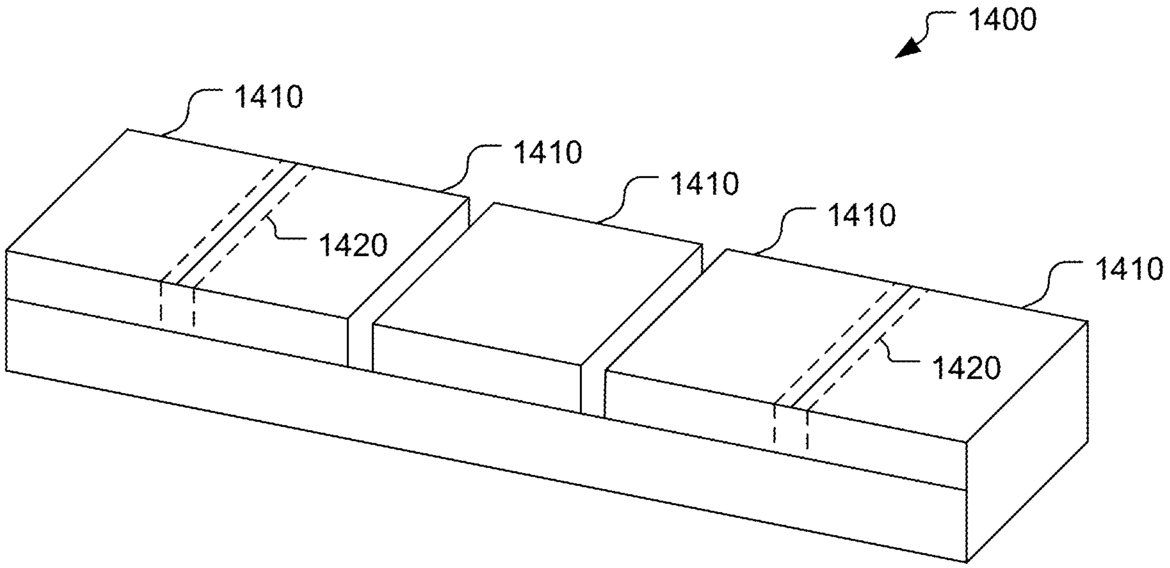
FIG. 14 is a perspective view of a linear array of antenna systems.

Referring to FIG. 14, a system 1400 comprises a linear array that includes multiple (here five) antenna systems 1410 each comprising an antenna system such as the antenna system 400, or the antenna system 700, or the antenna system 900, or the antenna system 1000, or the antenna system 1100, or the antenna system 1500. In the system 1400, two of the antenna systems 1410 on each end of the array are integrated together for mechanical strength and to keep the geometry symmetric. The system 1400 may also include slot antennas 1420 integrated with and disposed between each of the pairs of the antenna systems 1410 that are integrated. Underfill material may be used to strengthen the integration. One or more of the antenna systems 1410 may be out of phase with respect to one or more of the other antenna systems 1410 (e.g., one integrated pair of the antenna systems 1410 being out of phase with respect to the other antenna systems 1410), which may help improve scan symmetry, cross-polarization, and/or polarization orthogonality of the system 1400. A spacing of the antenna systems 1410 may be used that may help suppress any undesired mode (e.g., due to different propagations of different signal polarizations).

Implementation Examples

Implementation examples are provided in the following numbered clauses.

Clause 1. An antenna system comprising:

a patch antenna element disposed at a first level of the antenna system;

an energy coupler configured and coupled to the patch antenna element to transfer energy between the patch antenna element and a front-end circuit;

a ground conductor disposed at a second level of the antenna system, the patch antenna element and the ground conductor being disposed a separation distance away from each other and bounding respective sides of a volume defined by a projection, normal to a surface of the patch antenna element, of the patch antenna element to the ground conductor; and a floating conductor that is displaced from the ground conductor and the patch antenna element, the floating conductor comprising a body extending over a portion of the separation distance outside of, and in close proximity to, the volume.

Clause 2. The antenna system of claim 1, wherein:

the patch antenna element is configured and disposed relative to the ground conductor such that fringing fields will be produced by first energy provided by the energy coupler to the patch antenna element or by second energy wirelessly received by the antenna system; and the floating conductor is disposed to intersect a portion of the fringing fields.

Clause 3. The antenna system of claim 2, wherein the floating conductor comprises a conductive via and a conductive pad electrically connected to the conductive via, the conductive pad being disposed at the first level.

Clause 4. The antenna system of claim 3, wherein the conductive pad is adjacent to the patch antenna element.

Clause 5. The antenna system of claim 1, wherein the floating conductor is centered along an edge of the patch antenna element.

Clause 6. The antenna system of claim 1, wherein the floating conductor is a first floating conductor, the antenna system further comprising a second floating conductor, wherein the first floating conductor and the second floating conductor are centered along opposite edges of the patch antenna element.

Clause 7. The antenna system of claim 6, further comprising a plurality of third floating conductors, each of the plurality of third floating conductors comprising a set of conductive vias electrically coupled to each other.

Clause 8. The antenna system of claim 7, wherein the patch antenna element has an octagonal perimeter, wherein the plurality of third floating conductors comprises two pairs of the plurality of third floating conductors with respective third floating conductors disposed outside of, and in close proximity to, the volume along opposite sides of the octagonal perimeter.

Clause 9. The antenna system of claim 1, wherein the floating conductor is disposed adjacent to an edge of the ground conductor.

Clause 10. The antenna system of claim 1, wherein the floating conductor is entirely disposed between the first level of the antenna system and the second level of the antenna system.

Clause 11. The antenna system of claim 1, wherein the floating conductor is part of a plurality of floating conductors that are disposed symmetrically about a perimeter of the patch antenna element.

Clause 12. The antenna system of claim 11, wherein the patch antenna element comprises a plurality of edges, and wherein two or more of the plurality of floating conductors are disposed along each of at least two of the plurality of edges of the patch antenna element.

Clause 13. The antenna system of claim 1, wherein a perimeter of the patch antenna element extends inwardly in a vicinity of the floating conductor, maintaining at least a threshold separation between the patch antenna element and the floating conductor.

Clause 14. The antenna system of claim 1, wherein the patch antenna element is a first patch antenna element, and wherein the antenna system further comprises a second patch antenna element disposed at a third level of the antenna system, the second patch antenna element having a shape and a size similar to that of the first patch antenna element, the first patch antenna element and the second patch antenna element overlapping and being co-centered, and the first level of the antenna system being between the third level of the antenna system and the second level of the antenna system and close enough to the third level of the antenna system for the first patch antenna element to capacitively couple with the second patch antenna element.

Clause 15. The antenna system of claim 1, wherein the patch antenna element is a first-frequency-band patch antenna element, the front-end circuit is a first front-end circuit, and the energy coupler is a first energy coupler, and wherein the antenna system further comprises:

a second-frequency-band patch antenna element disposed at a fourth level of the antenna system, the first level of the antenna system being between the fourth level of the antenna system and the second level of the antenna system;

a second energy coupler configured to transfer energy between the second-frequency-band patch antenna element and a second front-end circuit; and a shorting conductor electrically connecting the ground conductor to a center of the second-frequency-band patch antenna element.

Clause 16. The antenna system of claim 15, wherein the second-frequency-band patch antenna element is a first second-frequency-band patch antenna element, and wherein the antenna system further comprises:

a second second-frequency-band patch antenna element disposed at a fifth level of the antenna system, the fourth level of the antenna system being between the fifth level of the antenna system and the first level of the antenna system; and a plurality of parasitic elements disposed in the fifth level of the antenna system separated from the second second-frequency-band patch antenna element.

Clause 17. The antenna system of claim 1, wherein the patch antenna element, the energy coupler, and the floating conductor comprise a first antenna system, the antenna system comprising a plurality of antenna systems in a linear array, the plurality of antenna systems including the first antenna system and a plurality of second antenna systems each configured similarly to the first antenna system, and wherein at least two of the plurality of antenna systems are out of phase with respect to each other.

Clause 18. The antenna system of claim 17, wherein the plurality of antenna systems consists of five antenna systems, wherein a first pair of the five antenna systems, disposed at a first end of the linear array, are integrated together and a second pair of the five antenna systems, disposed at a second end of the linear array, are integrated together, and wherein the first pair of the five antenna systems are out of phase with respect to the second pair of the five antenna systems.

Clause 19. The antenna system of claim 1, further comprising a parasitic element corresponding to an associated patch antenna element and disposed in a same level of the antenna system as the associated patch antenna element, wherein the floating conductor is entirely disposed between the second level of the antenna system and the level of the antenna system of the associated patch antenna element.

Clause 20. An antenna system comprising:

a patch antenna element;

a ground conductor;

a dielectric material disposed between the patch antenna element and the ground conductor; and means for localizing fringing fields corresponding to the patch antenna element and the ground conductor closer to the patch antenna element.

Clause 21. The antenna system of claim 20, wherein the means for localizing fringing fields comprise means for increasing an effective capacitance of the patch antenna element.

Other Considerations

Other examples and implementations are within the scope of the disclosure and appended claims. For example, configurations other than those shown may be used. Also, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices (also called wireless communications devices). A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of 20% or 10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of +20% or ±10%, +5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An antenna system comprising:

a patch antenna element disposed at a first level of the antenna system;

an energy coupler configured and coupled to the patch antenna element to transfer energy between the patch antenna element and a front-end circuit;

a ground conductor disposed at a second level of the antenna system, the patch antenna element and the ground conductor being disposed a separation distance away from each other and bounding respective sides of a volume defined by a projection, normal to a surface of the patch antenna element, of the patch antenna element to the ground conductor; and a floating conductor that is displaced from the ground conductor and the patch antenna element, the floating conductor comprising a body extending over a majority of the separation distance outside of, and in close proximity to, the volume.

2. The antenna system of claim 1, wherein:

the patch antenna element is configured and disposed relative to the ground conductor such that fringing fields will be produced by first energy provided by the energy coupler to the patch antenna element or by second energy wirelessly received by the antenna system; and the floating conductor is disposed to intersect a portion of the fringing fields.

3. The antenna system of claim 2, wherein the floating conductor comprises a conductive via and a conductive pad electrically connected to the conductive via, the conductive pad being disposed at the first level.

4. The antenna system of claim 3, wherein the conductive pad is adjacent to the patch antenna element.

5. The antenna system of claim 1, wherein the floating conductor is centered along an edge of the patch antenna element.

6. The antenna system of claim 1, wherein the floating conductor is a first floating conductor, the antenna system further comprising a second floating conductor, wherein the first floating conductor and the second floating conductor are centered along opposite edges of the patch antenna element.

7. The antenna system of claim 6, further comprising a plurality of third floating conductors, each of the plurality of third floating conductors comprising a set of conductive vias electrically coupled to each other.

8. The antenna system of claim 7, wherein the patch antenna element has an octagonal perimeter, wherein the plurality of third floating conductors comprises two pairs of the plurality of third floating conductors with respective third floating conductors disposed outside of, and in close proximity to, the volume along opposite sides of the octagonal perimeter.

9. The antenna system of claim 1, wherein the floating conductor is laterally displaced no more than 0.2λ from an edge of the ground conductor, where λ is a resonant wavelength of the patch antenna element.

10. The antenna system of claim 1, wherein the floating conductor is entirely disposed between the first level of the antenna system and the second level of the antenna system.

11. The antenna system of claim 1, wherein the floating conductor is part of a plurality of floating conductors that are disposed symmetrically about a perimeter of the patch antenna element.

12. The antenna system of claim 11, wherein the patch antenna element comprises a plurality of edges, and wherein two or more of the plurality of floating conductors are disposed along each of at least two of the plurality of edges of the patch antenna element.

13. The antenna system of claim 1, wherein the patch antenna element is a first patch antenna element, and wherein the antenna system further comprises a second patch antenna element disposed at a third level of the antenna system, the second patch antenna element having a shape and a size similar to that of the first patch antenna element, the first patch antenna element and the second patch antenna element overlapping and being co-centered, and the first level of the antenna system being between the third level of the antenna system and the second level of the antenna system and close enough to the third level of the antenna system for the first patch antenna element to capacitively couple with the second patch antenna element.

14. The antenna system of claim 1, wherein the patch antenna element is a first-frequency-band patch antenna element, the front-end circuit is a first front-end circuit, and the energy coupler is a first energy coupler, and wherein the antenna system further comprises:

a second-frequency-band patch antenna element disposed at a fourth level of the antenna system, the first level of the antenna system being between the fourth level of the antenna system and the second level of the antenna system;

a second energy coupler configured to transfer energy between the second-frequency-band patch antenna element and a second front-end circuit; and a shorting conductor electrically connecting the ground conductor to a center of the second-frequency-band patch antenna element.

15. The antenna system of claim 14, wherein the second-frequency-band patch antenna element is a first second-frequency-band patch antenna element, and wherein the antenna system further comprises:

a second second-frequency-band patch antenna element disposed at a fifth level of the antenna system, the fourth level of the antenna system being between the fifth level of the antenna system and the first level of the antenna system; and a plurality of parasitic elements disposed in the fifth level of the antenna system separated from the second second-frequency-band patch antenna element.

16. The antenna system of claim 1, wherein the patch antenna element, the energy coupler, and the floating conductor comprise a first antenna system, the antenna system comprising a plurality of antenna systems in a linear array, the plurality of antenna systems including the first antenna system and a plurality of second antenna systems each configured similarly to the first antenna system, and wherein at least two of the plurality of antenna systems are out of phase with respect to each other.

17. The antenna system of claim 16, wherein the plurality of antenna systems consists of five antenna systems, wherein a first pair of the five antenna systems, disposed at a first end of the linear array, are integrated together and a second pair of the five antenna systems, disposed at a second end of the linear array, are integrated together, and wherein the first pair of the five antenna systems are out of phase with respect to the second pair of the five antenna systems.

18. The antenna system of claim 1, further comprising a parasitic element corresponding to an associated patch antenna element and disposed in a same level of the antenna system as the associated patch antenna element, wherein the floating conductor is entirely disposed between the second level of the antenna system and the level of the antenna system of the associated patch antenna element.

19. An antenna system comprising:

a patch antenna element disposed at a first level of the antenna system;

an energy coupler configured and coupled to the patch antenna element to transfer energy between the patch antenna element and a front-end circuit;

a ground conductor disposed at a second level of the antenna system, the patch antenna element and the ground conductor being disposed a separation distance away from each other and bounding respective sides of a volume defined by a projection, normal to a surface of the patch antenna element, of the patch antenna element to the ground conductor; and a floating conductor that is displaced from the ground conductor and the patch antenna element, the floating conductor comprising a body extending over a portion of the separation distance outside of, and in close proximity to, the volume;

wherein a perimeter of the patch antenna element extends inwardly in a vicinity of the floating conductor, maintaining at least a threshold separation between the patch antenna element and the floating conductor.

20. An antenna system comprising:

a patch antenna element;

a ground conductor;

a dielectric material disposed between the patch antenna element and the ground conductor; and means for localizing fringing fields corresponding to the patch antenna element and the ground conductor closer to the patch antenna element, the means for localizing fringing fields extending over a first distance that is parallel to and a majority of a second distance separating the patch antenna element and the ground conductor.

21. The antenna system of claim 20, wherein the means for localizing fringing fields comprise means for increasing an effective capacitance of the patch antenna element.

* * * * *